United States Patent
Oberg et al.

(10) Patent No.: US 8,619,532 B1
(45) Date of Patent: Dec. 31, 2013

(54) ASYNCHRONOUS ASYMMETRY COMPENSATION

(71) Applicant: Marvell International Ltd., Hamilton (BM)

(72) Inventors: Mats Oberg, Cupertino, CA (US); Jin Xie, Longmont, CO (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/734,013

(22) Filed: Jan. 4, 2013

Related U.S. Application Data

(63) Continuation-in-part of application No. 12/104,879, filed on Apr. 17, 2008, now Pat. No. 8,477,581.

(60) Provisional application No. 60/912,313, filed on Apr. 17, 2007, provisional application No. 61/582,936, filed on Jan. 4, 2012, provisional application No. 61/644,331, filed on May 8, 2012.

(51) Int. Cl.
G11B 20/10 (2006.01)

(52) U.S. Cl.
USPC ..................................... 369/59.15; 369/124.1

(58) Field of Classification Search
None
See application file for complete search history.

(56) References Cited

U.S. PATENT DOCUMENTS

| | | | | |
|---|---|---|---|---|
| 6,192,016 B1* | 2/2001 | Kim | ........................... | 369/59.2 |
| 6,219,192 B1* | 4/2001 | Gopalaswamy et al. | ....... | 360/25 |
| 6,332,205 B1* | 12/2001 | Conway | ......................... | 360/45 |
| 6,747,936 B1* | 6/2004 | Shim | ........................ | 369/124.15 |
| 6,798,363 B2* | 9/2004 | Rapp | ............................. | 360/46 |
| 7,511,910 B1* | 3/2009 | Han | ................................ | 360/46 |
| 7,848,042 B1* | 12/2010 | Marrow | ......................... | 360/65 |
| 2002/0021519 A1* | 2/2002 | Rae | ................................ | 360/51 |
| 2010/0074078 A1* | 3/2010 | Cao et al. | ................... | 369/53.17 |

* cited by examiner

*Primary Examiner* — Thang Tran

(57) ABSTRACT

Asymmetry and offset compensation for a data signal may be performed by a compensation circuit as disclosed. A circuit can be configured to generate a compensated data signal from a data signal, and can include: an input node inputting the data signal, an offset coefficient feedback loop configured to calculate an offset coefficient based on the data signal, a scaling unit configured to scale the offset coefficient by a first predetermined value (the scaled offset coefficient representing an estimate of an asymmetry coefficient), an asymmetry coefficient feedback loop configured to calculate the asymmetry coefficient based on the data signal and an initial value, a signal selection unit that causes the circuit to calculate the compensated data signal using the asymmetry coefficient, and an output node that outputs the compensated data signal.

23 Claims, 11 Drawing Sheets

ASYMMETRIC WAVEFORM

SYMMETRIC WAVEFORM

ASYNCHRONOUS ASYMMETRY COMPENSATION

INCORPORATION BY REFERENCE

This application claims the benefit of U.S. Provisional Application Ser. No. 61/582,936, filed on Jan. 4, 2012, and Ser. No. 61/644,331, filed on May 8, 2012. Further, this application is a continuation-in-part of U.S. patent application Ser. No. 12/104,879, filed Apr. 17, 2008, which claims the benefit of U.S. Provisional Application 60/912,313 filed Apr. 17, 2007. The entire disclosures of the prior applications are incorporated herein by reference in their entireties.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

An optical disk, such as a CD, DVD, HD-DVD, or Blu-Ray disk, may contain data recorded as marks and spaces on the surface of the optical disk. The marks and spaces may correspond to bits of value '0' and '1' which comprise the data. After being recorded, the data may be read by detecting laser light reflected off the optical disk. The reflected light may be transformed by a photo-detector to an analog replay signal. When the data is written, each mark and space are intended to be the same nominal size on the optical disk. However, different types of optical disks and variations in the power and focus of the recording laser may cause asymmetry, where the sizes of the marks and spaces differ from their intended nominal sizes. For example, if the writing power is too small, then the mark size can be shorter than the nominal size, and the space size can be longer than the nominal size. When reading the marks and spaces, asymmetry in the replay signal may result in amplitude and duration variations and an increase in the bit error rate.

Examples of normal and distorted signals are shown in FIG. 1A and FIG. 1B, respectively. As illustrated in FIG. 1A, an ideal signal may exhibit near-identical durations of '1' and '0' bits. An asymmetric signal as depicted in FIG. 1B, in contrast, would tend to exhibit compressed or rarified amplitude widths, corresponding to shorter durations of a bit relative to a '0' bit, or vice-versa. The resulting asymmetric signal may have the same data content (same peaks and valleys as the ideal signal), but may instead contain amplitude variations that appear shifted downwards in the y-axis, since the data signal may be spending more time at the longer '0' bit than at the shorter '1' bit. A further complication may arise if there is a D.C. or other low frequency offset component biasing the data signal (signal "offset," FIG. 1B). This could result in an undesired shift to the entire signal in addition to the signal asymmetry.

SUMMARY

Aspects of the disclosure can provide an asymmetry compensation system with improved signal acquisition timing to reduce the time required to determine the asymmetry coefficient $\alpha(k)$. It is a further goal to provide an improved error signal generation method used during the determination of and steady-state corrections to $\alpha(k)$.

Accordingly, aspects of the disclosure relate to a method for generating a compensated data signal comprising (1) in a first mode: calculating an offset coefficient based on a data signal, scaling the offset coefficient to calculate an estimated asymmetry coefficient, generating the compensated data signal as a function of the offset coefficient, the estimated asymmetry coefficient and the data signal, and repeating the steps of the first mode until a predetermined criteria is met, and (2) in a second mode: calculating an asymmetry coefficient as a function of the data signal and the offset coefficient, where the initial value of the asymmetry co-efficient is the estimated asymmetry coefficient, and generating the compensated data signal as a function of the offset coefficient and the asymmetry coefficient.

Further aspects of the disclosure relate to the above method in which scaling the offset coefficient comprises multiplying the offset coefficient by a predetermined steady-state ratio of the asymmetry coefficient to the offset coefficient, in which the offset coefficient is calculated based on the amount of low frequency offset error to the data signal, and in which the compensated data signal in either mode is represented by $s(k)$. $s(k)$, in turn, includes terms $\alpha(k)$, which represents the estimated asymmetry coefficient in the first mode or the asymmetry coefficient in the second mode, $\alpha_{ofs}(k)$, which represents the offset coefficient, and k which represents an interval of discrete time.

Other aspects of the disclosure describe variations of the above method in which a transition from the first mode to the second mode is made by switching a selection input of a signal de-mux, the predetermined criteria for repeating the steps of the first mode comprises checking if the change of $\alpha_{ofs}(k)$ over a certain period of time is less than a predetermined value, and the asymmetry coefficient is represented by $\alpha(k)$. $\alpha(k)$ includes a term $\alpha_{err}(k)$, which is calculated by assigning $\alpha_{err}(k)$ equal to $s(k)$ if $s(k)$ falls between predetermined thresholds T and $-T$, and assigning $\alpha_{err}(k)$ equal to T if $s(k)$ falls above T, and $\alpha_{err}(k)$ equal to $-T$ if $s(k)$ falls below $-T$.

In still other aspects of the disclosure, the offset coefficient is calculated by a first feedback loop and the asymmetry coefficient is calculated by a second feedback loop.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE EMBODIMENTS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

Figure 1B:
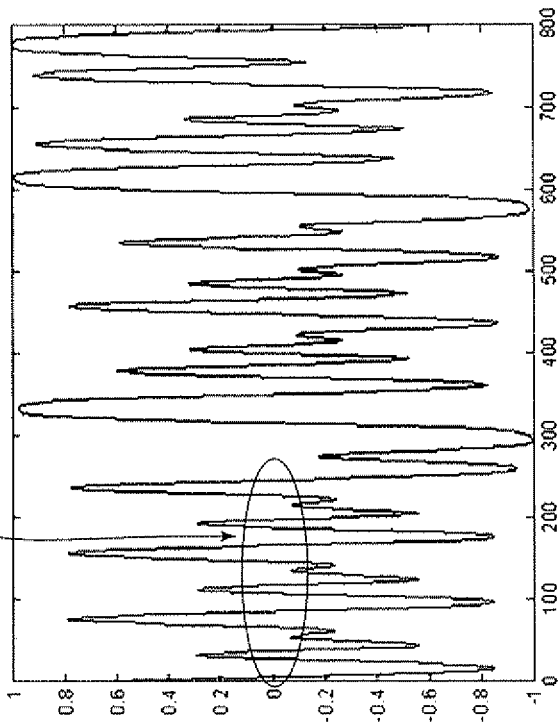
FIGS. 1A and 1B show diagrams of hypothetical data signals corresponding to an ideal (non-distorted) data signal and an asymmetric data signal, respectively.
Figure 1A:
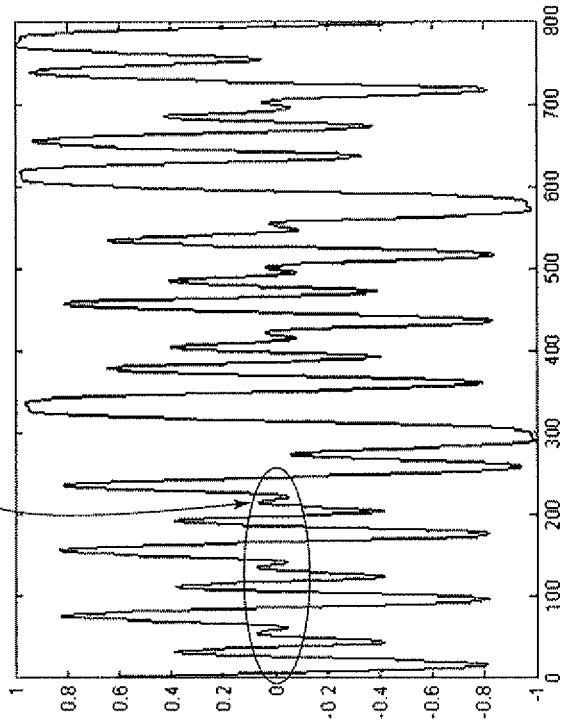
Figure 2:
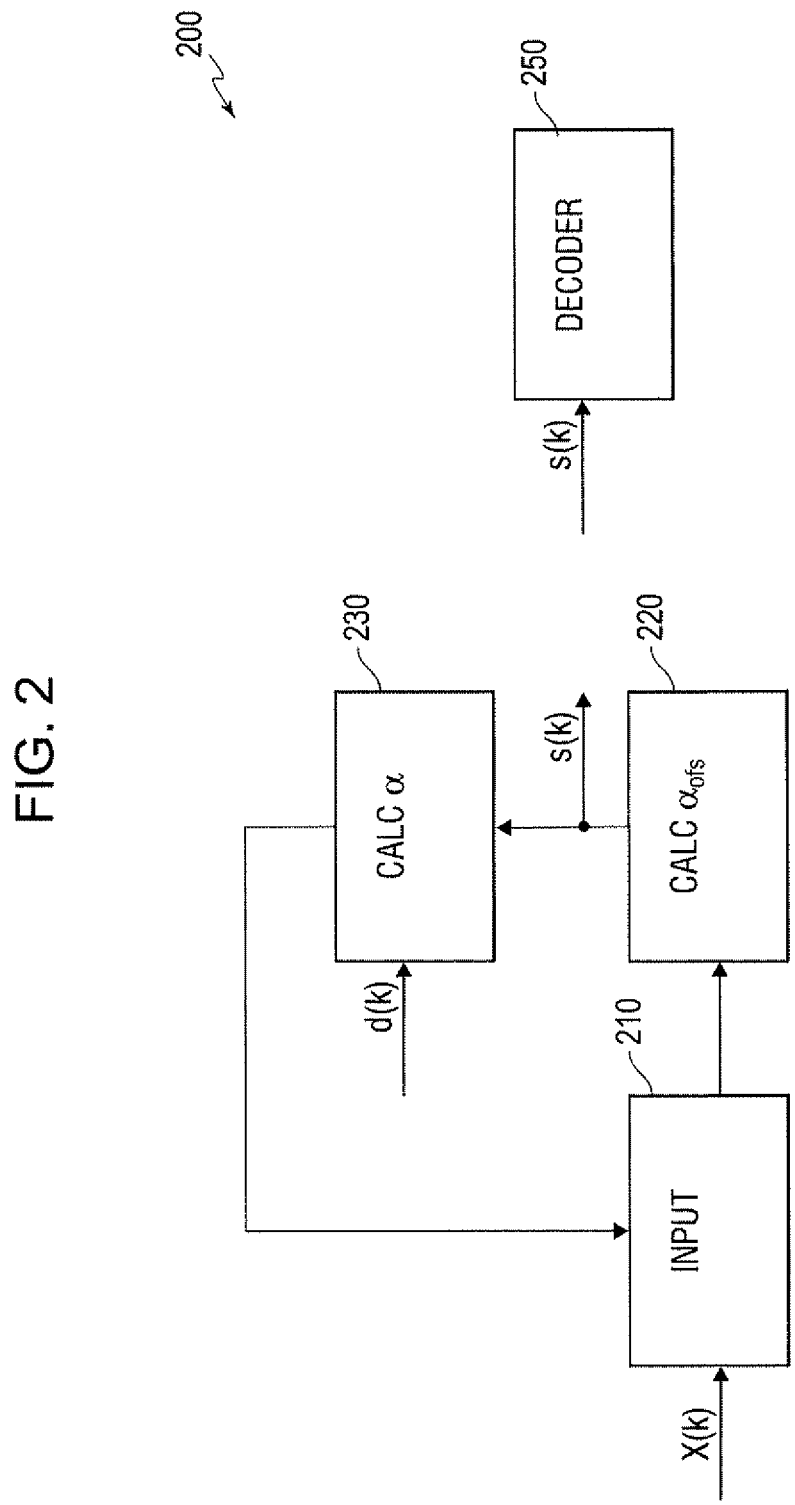
FIG. 2 shows an exemplary block diagram of an asymmetry compensation system 200.

FIG. 2 is an exemplary block diagram of an asymmetry compensation system 200. As shown in FIG. 2, the asymmetry compensation system 200 includes an input port 210 coupled to an $\alpha_{ofs}(k)$ calculation feedback loop 220. The $\alpha_{ofs}(k)$ feedback loop 220 feeds into the $\alpha(k)$ calculation feedback loop 230. Slicer decision d(k) is also fed into the $\alpha(k)$ calculation feedback loop 230. The output of the asymmetry compensation system is the compensated data signal, s(k), which is transmitted to the decoder 250 for the subsequent data extraction steps.

Figure 3:
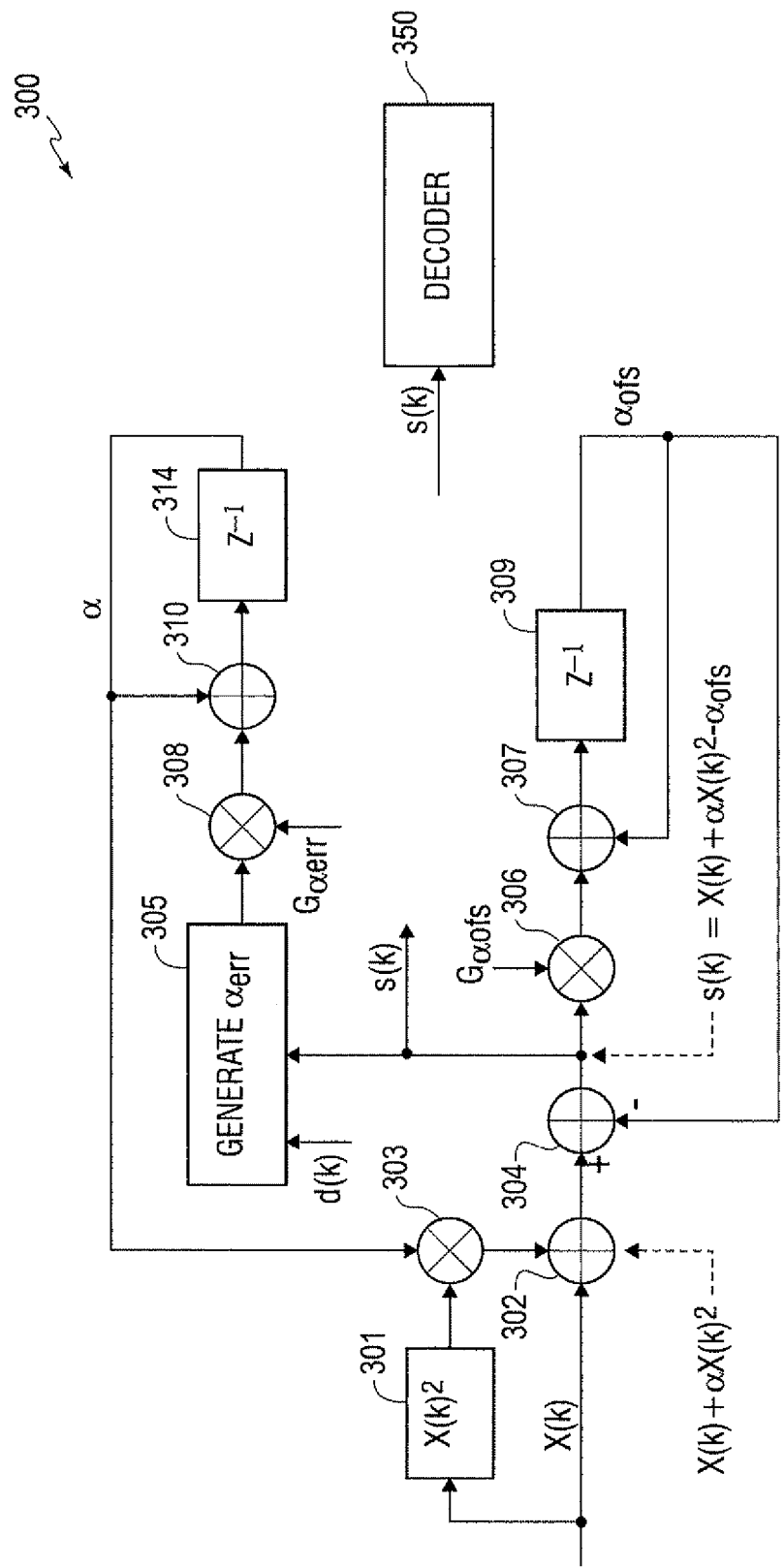
FIG. 3 shows a detailed exemplary block diagram of an asymmetry compensation system 300.

FIG. 3 is a more detailed exemplary block diagram of an asymmetry compensation system 300. FIG. 3 illustrates with more clarity how a compensated data signal may be constructed from the incoming data signal X(k) and elements 301-314 of FIG. 3. In FIG. 3, X(k) is input into both summing unit 302 (X(k)+ . . . ) and squaring unit 301 (X(k)$^2$). The output of squaring unit 301 is then multiplied by $\alpha(k)$ in product block 303 ($\alpha(k)X(k)^2$), the output of which is fed back into summing unit 302. The output of summing unit 302 now represents a portion of the compensated data signal, equal to X(k)+$\alpha(k)$X(k)$^2$. The final term, $-\alpha_{ofs}(k)$, is appended to the expression by difference unit 304. As indicated in FIG. 3, elements 306, 307 and 309 iteratively determine the value of $\alpha_{ofs}$, and comprise the CALC $\alpha_{ofs}$ block 220 depicted in FIG. 2. Likewise, elements 305, 308, 310 and 314 iteratively determine the value of $\alpha(k)$, and comprise the CALC a block 230 depicted in FIG. 2. Finally, a slicer decision bit stream d(k) is input into GENERATE $\alpha_{err}$ block 305, which is used in conjunction with s(k) to generate $\alpha_{err}$ in the related art.

Figure 4:
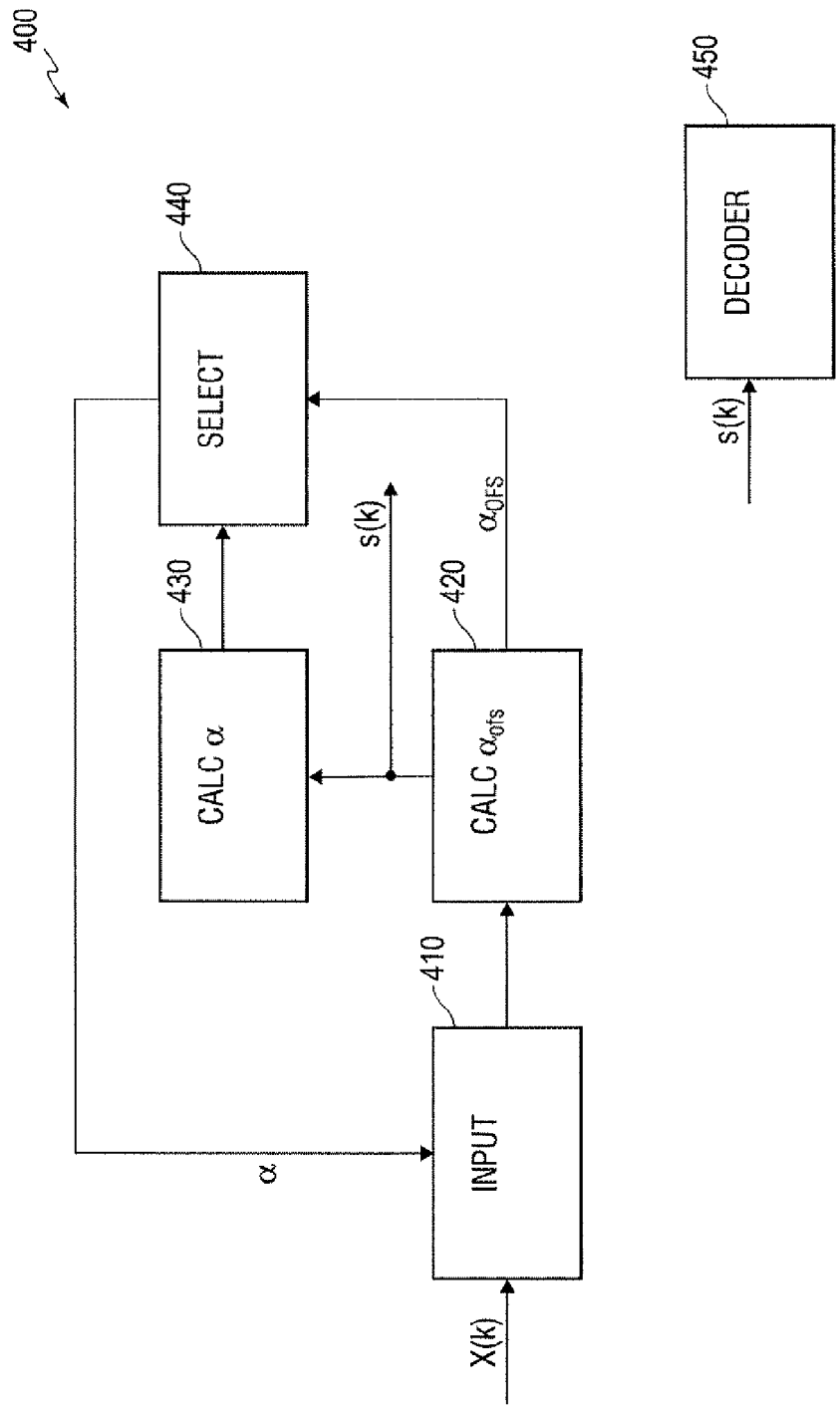
FIG. 4 shows an exemplary block diagram of an asymmetry compensation system with improved signal acquisition timing 400 according to an embodiment of the disclosure.

FIG. 4 is an exemplary block diagram of an asymmetry compensation system 400 with improved signal acquisition timing according to an embodiment of the disclosure. As shown in FIG. 4, the asymmetry compensation system 400 includes an input port 410 coupled to an $\alpha_{ofs}(k)$ calculation feedback loop 420. This time, the $\alpha_{ofs}(k)$ feedback loop 420 feeds into both an $\alpha$ calculation feedback loop 430 and a signal select junction 440. Key differences between the asymmetry compensation system 400 and the asymmetry compensation system 200 are the addition of the signal select junction 440 and the omission of the slicer decision bit stream d(k) input into the CALC $\alpha$ block 430.

In an embodiment of the present invention further described below, the asymmetry compensation system 400 operates in two distinct modes of operation: a first mode or an acquisition mode, and a second mode or a tracking mode. In the first mode (acquisition), the value of $\alpha(k)$ is estimated directly from the value of $\alpha_{ofs}(k)$. In this mode, the signal select junction 440 would simply scale (multiply by a constant) $\alpha_{ds}(k)$ (entering junction 440 from the bottom in FIG. 4) and pass the resulting (estimated) value of $\alpha(k)$ to the input port 410. Because $\alpha(k)$ is estimated from $\alpha_{ofs}(k)$, which converges to its steady-state value very rapidly, the estimated value of $\alpha(k)$ also converges very rapidly.

During the second mode of operation (tracking), the actual (non-estimated) value of $\alpha(k)$ is calculated iteratively from the compensated data signal s(k). This process is more time consuming than the determination of the steady-state value of $\alpha_{ofs}(k)$. However, in an embodiment, the process of determining $\alpha(k)$ can be expedited by starting with an estimate of $\alpha(k)$ which is already close to the final value. This starting value is the estimate determined during the first mode of operation.

Figure 5:
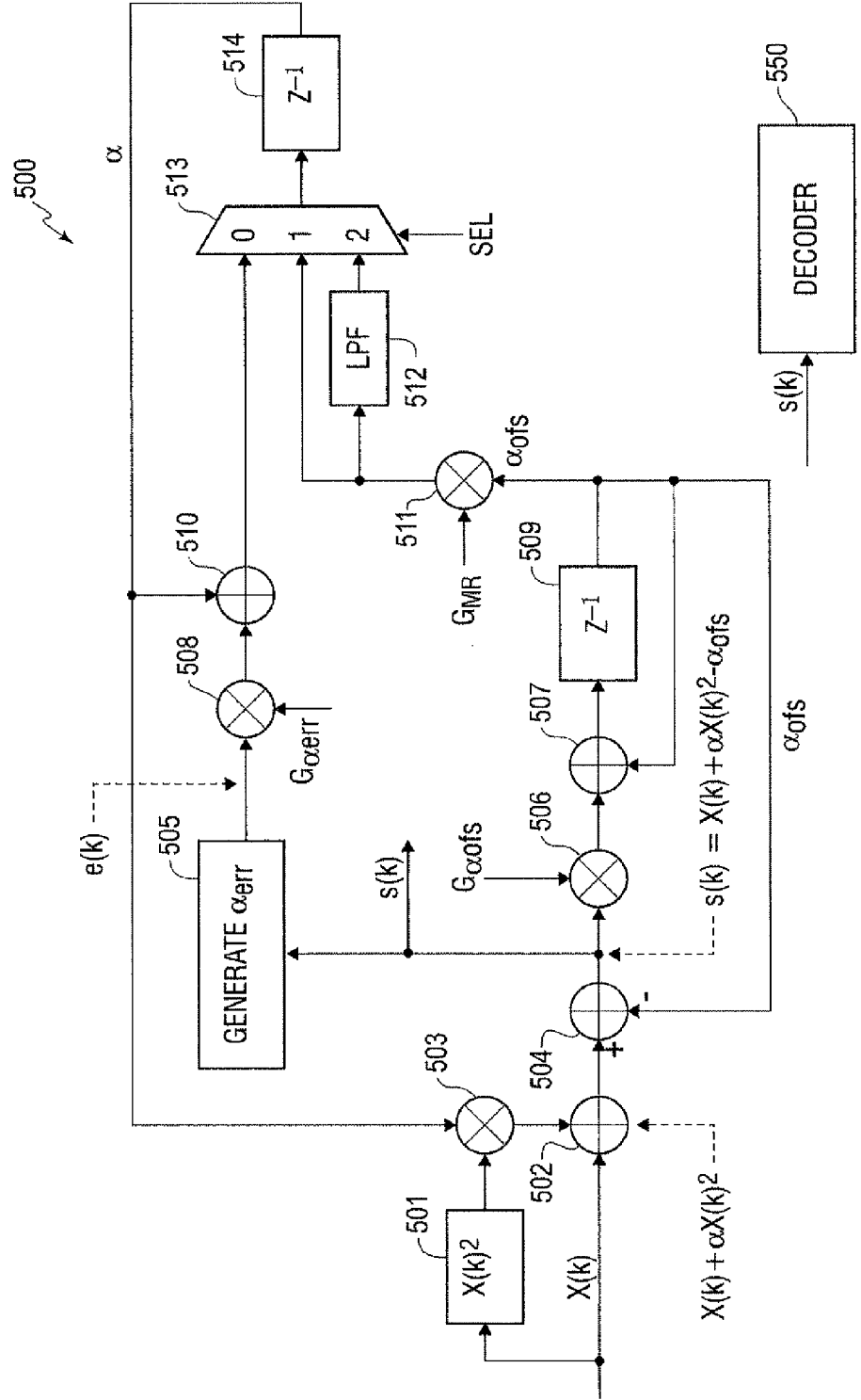
FIG. 5 shows a detailed exemplary block diagram of an asymmetry compensation system with improved signal acquisition timing 500 according to an embodiment of the disclosure.

FIG. 5 is an exemplary block diagram of an asymmetry compensation system 500 with improved signal acquisition timing according to an embodiment. The operation of the asymmetry compensation system 500 will now be described in greater detail.

During its operation (as described above), the asymmetry compensation system 500 takes a data signal X(k) as an input and generates a compensated data signal s(k)=X(k)+$\alpha(k)$X(k)$^2$−$\alpha_{ofs}(k)$ as its output, which is transmitted to the decoder 550. The individual terms $\alpha(k)X(k)^2$ and $\alpha_{ofs}(k)$ correspond to the correction terms for signal asymmetry and signal offset, respectively.

In general, the signal asymmetry corrected by $\alpha(k)X(k)^2$ may be either negative or positive, owing to respectively longer or shorter '1' bit lengths, and generally is reflected by signal compression/expansion as a function of time, e.g., the marks are longer than spaces causing negative signals to have longer time duration than positive signals. It is computationally efficient to compute a single value $\alpha(k)$ which will optimize (minimize) the net effect of asymmetry to the data signal, and to scale the X(k)$^2$ term by this value when adding it to the initial data signal X(k).

The low frequency/direct current (DC) bias offset term $\alpha_{ofs}(k)$ may be strongly correlated to the asymmetry coefficient $\alpha(k)$ of the $\alpha(k)X(k)^2$ term. In this case, there is no special form (such as $\sim$X(k)$^2$) that the correction term is given, and generalized offset term $\alpha_{ofs}(k)$, which may be positive, negative or zero, is introduced.

In an embodiment, acquisition and tracking modes may be temporally separated, such that the asymmetry compensation system 500 begins its operation in a first mode (for example, the acquisition mode), and later switches to the second mode (for example, the tracking mode) after a certain criteria is met. This criteria may be represented by a calculated parameter reaching a certain value, such as the rate of change of $\alpha_{ofs}(k)$ between successive intervals of discrete time falling below some predetermined value (i.e., the change of $\alpha_{ofs}(k)$ over a certain period of time$\leq \Delta$), or may simply occur after a predetermined amount of time has elapsed.

The operational difference between the acquisition and tracking modes is the way the value of $\alpha(k)$ is determined. In the acquisition mode, $\alpha(k)$ is determined directly from $\alpha_{ofs}(k)$ via a scaling factor, whereas in the tracking mode, $\alpha(k)$ is iteratively determined from the compensated data signal s(k). The modes are demarcated by the selection de-mux 513. As illustrated in FIG. 5, state "1" represents the acquisition mode, and state "0" represents the tracking mode. State "2" may also be selected, and simply represents the acquisition mode signal with a filtered (less noisy) output.

The determination of the bias error/offset coefficient $\alpha_{ofs}(k)$ can be the same in either mode. As depicted in FIG. 5, $$\alpha_{ofs}(k) = \alpha_{ofs}(k-1) + G_{ofs}s(k-1) \quad \text{Eq. (2):}$$

In Eq. (2), s(k−1) represents an offset error signal that may be generated from summing block 504. The offset correction $\alpha_{ofs}(k)$ is subtracted from the partial data compensation signal $(X(k)-\alpha(k)X(k)^2)$ as $-\alpha_{ds}(k)$. The process repeats iteratively, resulting in an output signal s(k), equal to $X(k)+\alpha X(k)^2 - \alpha_{ofs}(k)$, taken from the output of difference unit 504.

Because the determination of $\alpha_{ofs}(k)$ amounts to little more than bit-wise envelope detection, its determination may occur very rapidly. The relationship between $\alpha(k)$ and $\alpha_{ofs}(k)$ is an approximately linear relationship between the final steady-state values of each. That is, knowing the final value of $\alpha_{ofs}(k)$ allows one to calculate the final value of α to a high degree of accuracy. Thus, it can be possible to initially estimate the final value of $\alpha(k)$ from $\alpha_{ofs}(k)$ alone.

Figure 7:
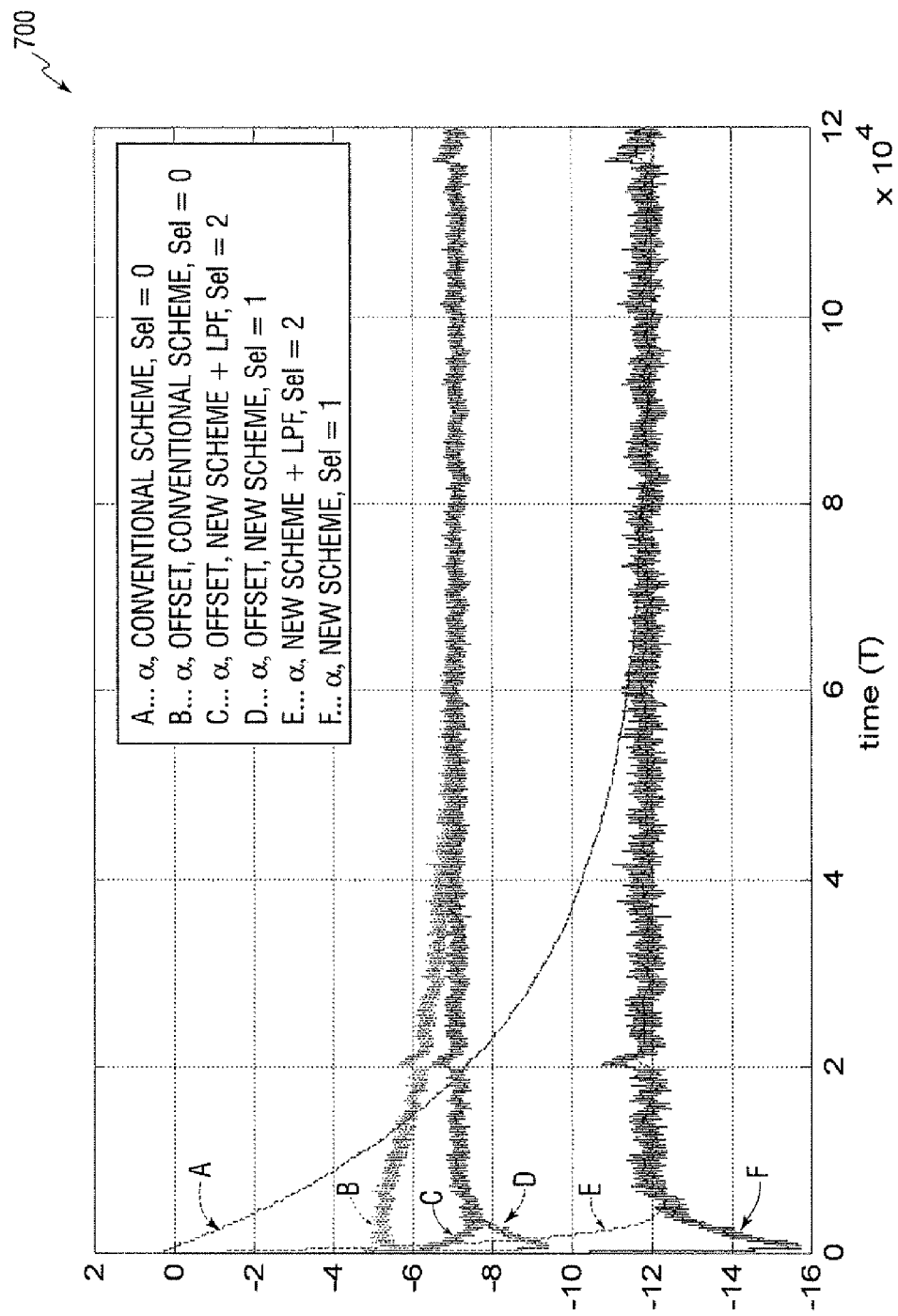
FIG. 7 shows a graph 700 illustrating the timing required for the values of $\alpha$ and $\alpha_{ofs}$ to converge using various systems.

FIG. 7 illustrates the linear relationship between $\alpha(k)$ (curves A, E, and F) and $\alpha_{ofs}(k)$ (curves B, C and D). The right hand side of the graph (T≥8) reflects the steady-state behavior, where the values of $\alpha(k)$ and $\alpha_{ofs}(k)$ have converged to their final, true values. As can be seen in FIG. 7, the steady-state value of $\alpha_{ofs}(k)$ (regardless of which scheme is employed) converges to ~−7 in the given units. In contrast, the steady-state value of $\alpha(k)$ (regardless of scheme) converges to a value ~−12 in the given units. The magnitude ratio ($G_{MR}$) of these signals is ~−12/−7≈1.7. This relationship holds reliably well for a variety of simulated scenarios and waveforms. Accordingly, this value may be used to rapidly estimate $\alpha(k)$ from $\alpha_{ofs}(k)$ during the acquisition mode of the circuit.

The reason the relationship between $\alpha(k)$ and $\alpha_{as}(k)$ is predictable is because they are physically related to one another, although they are not simply related, in that a determination of the rapidly converging value of $\alpha_{ofs}(k)$ provides an exact determination of the value of $\alpha(k)$. However, the loosely linear relationship does allow for an estimate, or seed value of $\alpha(k)$ to be rapidly determined.

Accordingly, in an embodiment the operation of the asymmetry compensation system 500 begins in an acquisition mode, with the selection de-mux 513 in the state "1" as depicted in FIG. 5. In the acquisition mode, the value of $\alpha_{ofs}(k)$ is initially determined, and the estimated value of α is calculated directly from $\alpha_{ofs}(k)$ according to the magnitude ratio $G_{MR}$. When the rate of change of $\alpha_{ofs}(k)$ between subsequent intervals of discrete time (k, k+1 . . . etc.) falls below a predetermined value, $\alpha_{ofs}(k)$ will be determined to have reached a steady-state value. (Note that, in this case, steady-state does not mean that $\alpha_{ofs}(k)$ stops changing altogether. In contrast, it indicates only that $\alpha_{ofs}(k)$ has converged to an equilibrium point, and that subsequent corrections to $\alpha_{ofs}(k)$ will tend only to modulate its value about that equilibrium point).

Because $\alpha(k)$ is tethered to $\alpha_{ofs}(k)$ via $G_{MR}$ during the acquisition mode, $\alpha(k)$ will stop changing at the same rate (and time) as $\alpha_{ofs}(k)$. At this point, $\alpha(k)$ (estimate) is at a "seed" value relatively close to its final (steady-state) value. An advantage of one embodiment is that this approach may result in an estimate of $\alpha(k)$ close enough to its final value allow the decoder 550 to begin decoding s(k), even before the asymmetry compensation system 500 has entered the tracking mode.

Figure 6:
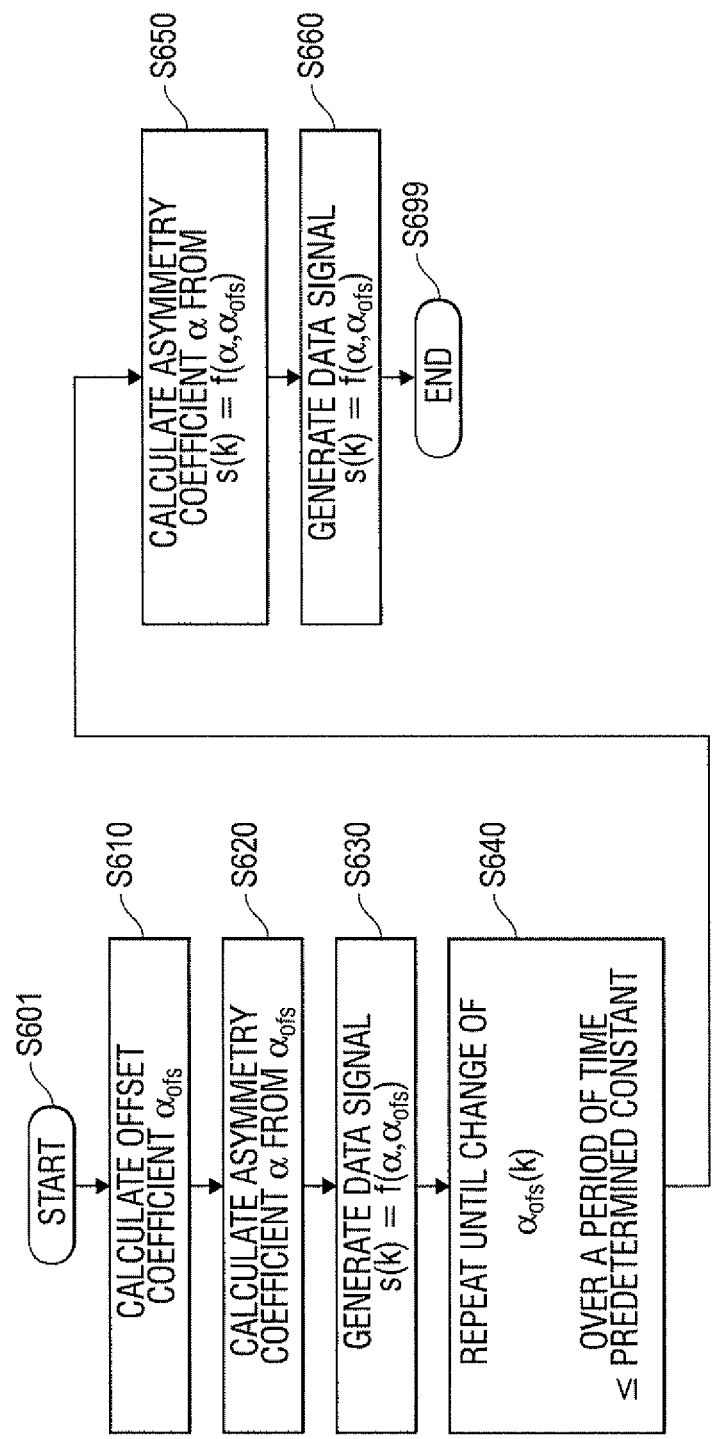
FIG. 6 shows a flow chart 610 illustrating the method disclosed for generating the compensated data signal according to an embodiment of the disclosure.

FIG. 6 is a flowchart outlining an exemplary dual state compensation process 600. The process begins at S601 and proceeds to S610, which begins the first state of operation. At S610, the offset coefficient $\alpha_{ofs}(k)$ is first calculated. This occurs very rapidly. Next, at S620, $\alpha(k)$ is calculated from $\alpha_{ofs}(k)$, which may also occur very rapidly as $\alpha(k)$ is simply scaled from $\alpha_{ofs}(k)$ by a factor $G_{MR}$.

At S630, the data signal s(k) is corrected by the current values of $\alpha_{ofs}(k)$ and $\alpha(k)$, and the circuit moves into S640. (Because k denotes the current discrete time interval, each of $\alpha_{ofs}(k)$, $\alpha(k)$ and s(k) change with each k+1 interval). Although the circuit is still functioning in the acquisition mode, the decoder may suddenly be able to decode s(k) at any time; this will occur if $\alpha_{ofs}(k)$ and $\alpha(k)$ are near their actual values. This does not mean the circuit begins functioning differently, however, and the circuit will stay at S640, iterating in the acquisition mode, until a predetermined condition is met.

Figure 11:
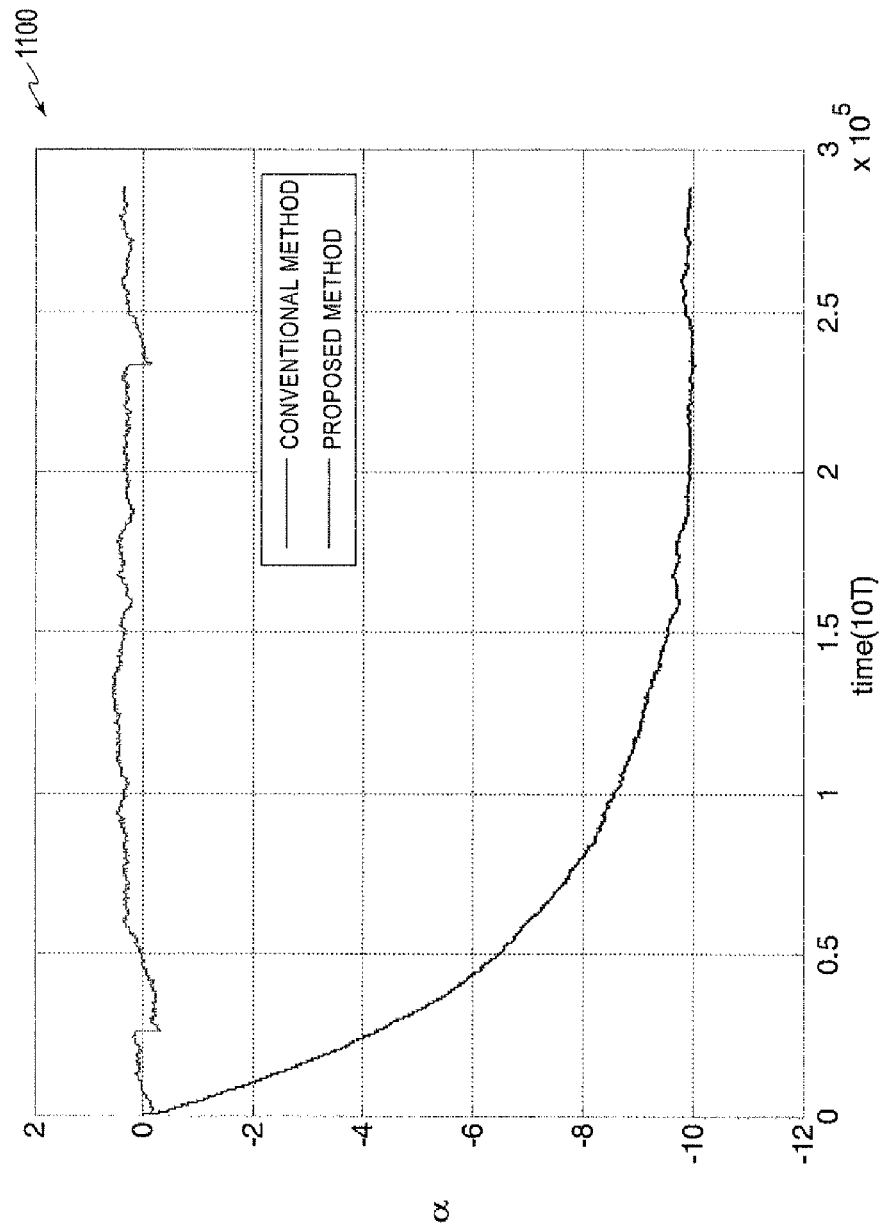
FIG. 11 shows a simulation result 1100 comparing various system's $\alpha(k)$ adaptation for a BDXL waveform with asymmetric distortion.

At the conclusion of S640, some predetermined condition has been met. In FIG. 11, this condition is that the rate of change of $\alpha_{ofs}(k)$ has fallen below some predetermined value.

At S650, $\alpha(k)$ is "un-tethered" from $\alpha_{ofs}(k)$. This means the selection SEL element 513 is changed to "0", and $\alpha(k)$ is computed by the α determination loop (block 430 of FIG. 4, or elements 505, 508, 510 and 514 of FIG. 5). Since $\alpha(k)$ is already at a seed value (very close to) of its final value by virtue of the tethering (scaling) to $\alpha_{ofs}(k)$, playback may have already begun. Even if it hasn't, however, there is only a small difference between $\alpha(k)$ seed and $\alpha(k)$ final, and thus only a small number of necessary intervals of discrete time may be necessary.

At S660, s(k) is generated (corrected) from the true values of $\alpha_{ofs}(k)$ and $\alpha(k)$. The circuit will stay at S660, tracking the raw data feed X(k), until the conditions change (i.e., a new track on the optical disc is selected), at which point the circuit returns to S601.

For example, FIG. 7 depicts an example (A) where a in the related art system (non-estimated) converges to a final value of ~−12 at time T≈8*10^4 (around the center of the graph). The calculation of a using the new scheme (E or F) crosses −12 at T≈0.25*10^4 and converges by approximately T≈0.5*10^4. This is a factor of between 8/(¼) to 8/(½)=32 to 16 times faster than in the conventional scheme (A).

Once in the tracking mode, the value of α is untethered from $\alpha_{ofs}(k)$ (selection de-mux 513 can be switched from "2" or "1" to "0"), and the value of α becomes determined by iterative operations performed on the compensated data signal s(k). In particular, this process is executed by the GENERATE $\alpha_{err}$ unit 505, the gain block $G_{\alpha err}$ 508, the summing block 510 and the unit delay element 514.

During the tracking mode, $\alpha(k)$ is now given by $$\alpha(k) = \alpha(k-1) + G_{\alpha err}\alpha_{err}(k) \quad \text{Eq. (3):}$$

Eq. (3) may be derived from FIG. 5, and is similar to the expression for $\alpha_{ofs}(k)$ (Eq. (2)) derived above. To iteratively generate $\alpha(k)$, s(k) is input to the GENERATE $\alpha_{err}$ unit 505, which generates the error signal $\alpha_{err}(k)$. $\alpha_{err}(k)$ is then multiplied by gain block $G_{\alpha err}$ 508 and added to $\alpha(k-1)$ by summing block 510. In an embodiment, $\alpha_{err}(k)$ is based on s(k) and a predetermined threshold T according to the following formula:

$$\alpha_{err}(k) = \begin{cases} T, & s(k) > T \\ -T, & s(k) < -T \\ s(k), & \text{else} \end{cases} \quad \text{Eq. (4)}$$

Figure 8:
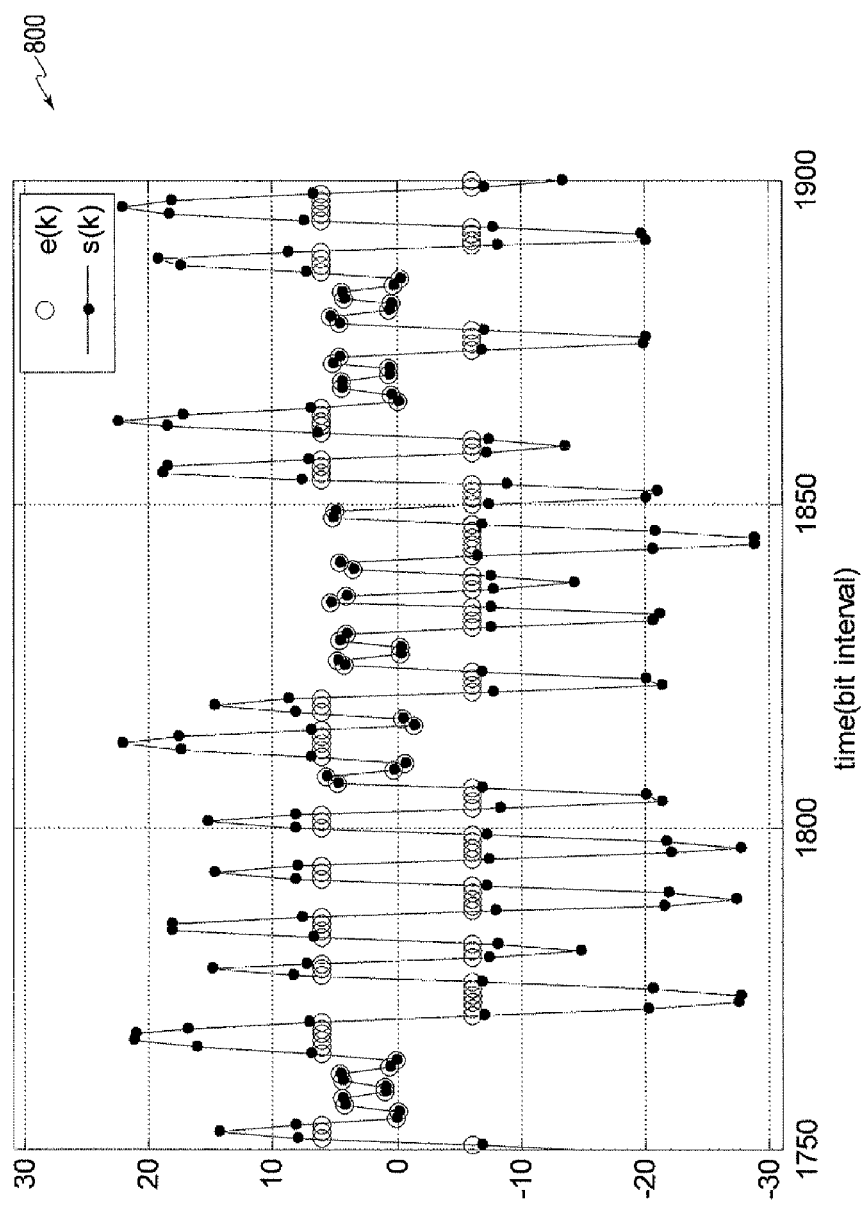
FIG. 8 shows a simulation result 800 of a noiseless Blu-Ray negative asymmetry waveform.

FIG. 8 illustrates a simulation of the new method for generating $\alpha_{err}(k)$. In FIG. 8, an artificial, noise free Blu-ray negative asymmetry waveform is shown. $\alpha(k)$ is set to 0 (no asymmetry compensation, but the $\alpha_{ofs}$ loop keeps running), and s(k) is observed to be asymmetric about zero. It may also be observed that the positive values of s(k) are compressed and the negative values of s(k) are stretched, as would be expected from an asymmetric waveform. Finally, in FIG. 8 $\alpha_{err}(k)$ is denoted as e(k) (for error).

Eq. (4) is equivalent to passing s(k) through a limiter that limits output to +/−T. The output has been further passed through a high-pass filter (not shown) that removed its mean. Accordingly, in FIG. 8 s(k) has zero mean, and the short pulses are centered at a positive value rather than zero. Thus, in FIG. 8 with T=6, e(k) takes on positive values from the (positive-centered) short pulses. Thus, the mean of e(k) is positive, meaning α(k) should adapt to a positive value.

The function of threshold T is to force e(k) to only pick up the values of s(k) around zero. If there were no T, (or, equivalently, if T=∞), then e(k)=s(k). Since s(k) is zero mean, e(k) is also zero mean, and thus e(k) will not drive α(k) to change.

Figure 9:
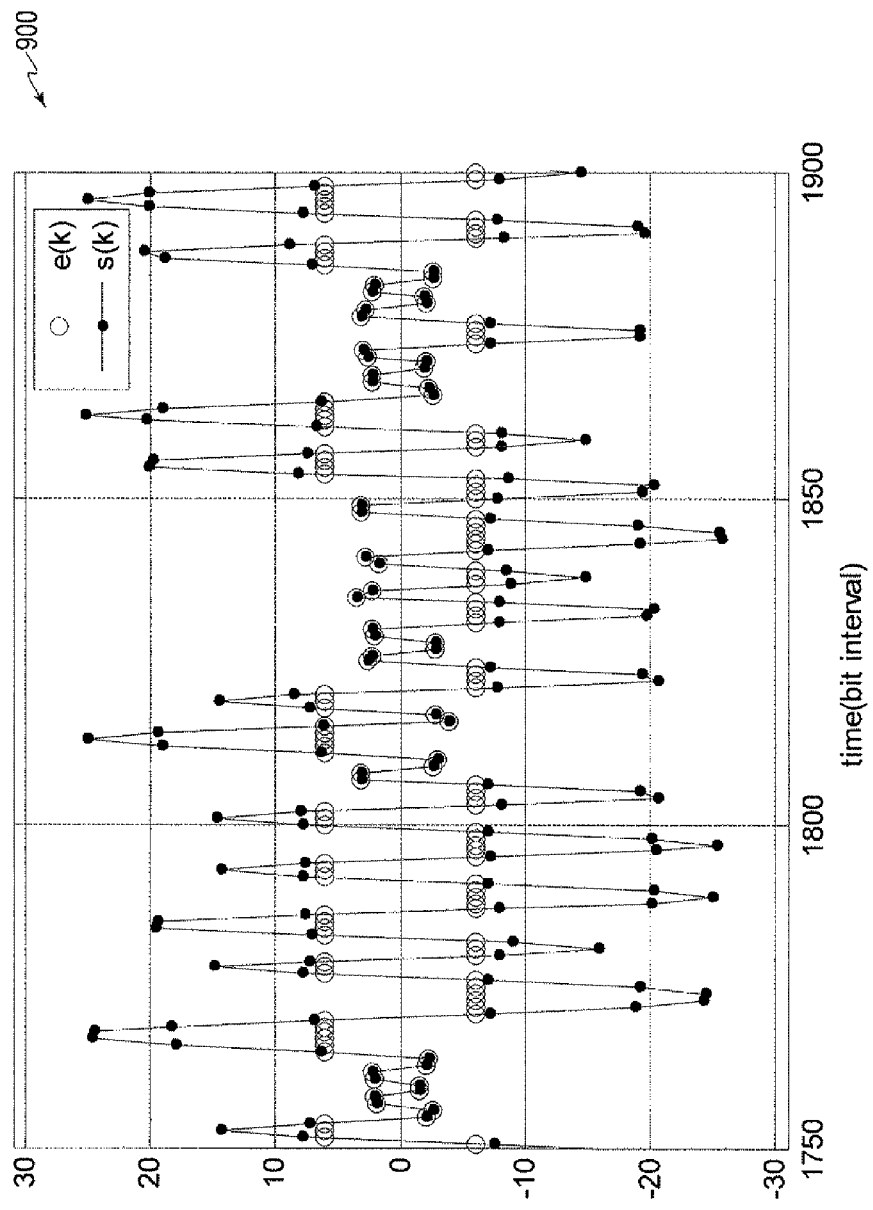
FIG. 9 shows a simulation result 900 of a noiseless Blu-Ray waveform without asymmetry.

In contrast, FIG. 9 shows simulation results of an artificial noise free Blu-ray waveform without asymmetry. The curve in FIG. 9 is s(k). In this example, α(k) is again set to 0 (no asymmetry compensation), and s(k) is now observed to be symmetric about zero. This time, the short pulses are centered about zero. Thus, with T=6, e(k) is centered at zero, implying α(k) also should not change.

In an embodiment, the slicer decision d(k) is not needed. Thus, a system can be implemented with less components at less cost.

According to an aspect of the disclosure, the disclosed method improved signal convergence. In an example, rather than exhibiting asymmetric compression/rarefaction, the distorted signal possesses an imbalance between the number of positive and negative samples. This may cause s(k) to take on a disproportionate number on non-zero values, driving α(k) to adapt to a non-zero value.

Figure 10:
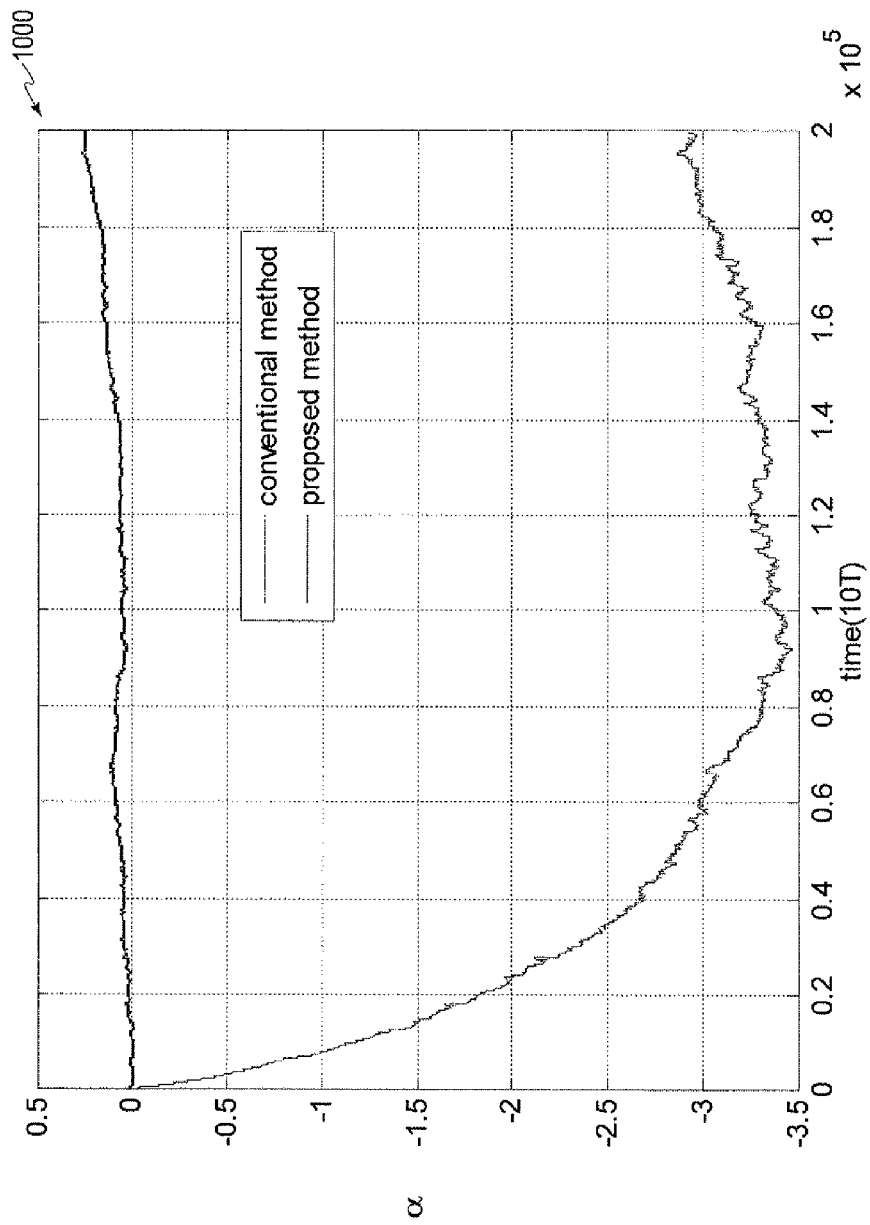
FIG. 10 shows a simulation result 1000 comparing various system's $\alpha(k)$ adaptation for a waveform with imbalance, but not asymmetric distortion.

With the proposed method, the adaptation of α(k) reflects only asymmetry (not imbalance). FIG. 10 shows a simulation result of a waveform with imbalance distortion but no asymmetry distortion. With the conventional method, α(k) adapts (incorrectly) to −3, while with the proposed method, α(k) (correctly) adapts to 0.

According to another aspect of the disclosure, the proposed method is used for a Blu-Ray eXtra Large (BDXL) format. With a BDXL format, the inter-symbol interference (ISI) is larger than the ISI of a regular Blu-ray waveform. As a result, slicer decisions d(k) are more unreliable, which negatively affects the conventional α(k) adaptation. FIG. 11 shows simulation results of a synthetic BDXL waveform with asymmetry. Using the proposed method, α(k) adapts correctly to −10.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below. The embodiments can be also implemented in the form of a computer readable medium storing instructions to carry out steps to perform the method or apparatus as described in the present disclosure.

What is claimed is:

1. A method for generating a compensated data signal, the method comprising:
   in a first mode:
      calculating an offset coefficient based on a data signal;
      scaling the offset coefficient to calculate an estimated asymmetry coefficient, and
      generating the compensated data signal as a function of the offset coefficient, the estimated asymmetry coefficient and the data signal.

2. The method of claim 1, further comprising:
   repeating the steps of the first mode until a predetermined criteria is met; and
   in a second mode:
      calculating an asymmetry coefficient as a function of the data signal and the offset coefficient, where the initial value of the asymmetry coefficient is the estimated asymmetry coefficient, and
      generating the compensated data signal as a function of the offset coefficient and the asymmetry coefficient.

3. The method of claim 1, wherein scaling the offset coefficient comprises multiplying the offset coefficient by a predetermined steady-state ratio of the asymmetry coefficient to the offset coefficient.

4. The method of claim 1, wherein the offset coefficient is calculated based on the amount of low frequency offset error to the data signal.

5. The method of claim 2, wherein the compensated data signal in either mode is given by:

$$s(k)=X(k)+\alpha(k)X(k)^2-\alpha_{ofs}(k)$$

where s(k) represents the compensated data signal, X(k) represents the data signal, α(k) represents the estimated asymmetry coefficient in the first mode or the asymmetry coefficient in the second mode, $\alpha_{ofs}(k)$ represents the offset coefficient, and k represents an interval of discrete time.

6. The method of claim 2, wherein a transition from the first mode to the second mode is made by switching a selection input of a signal de-mux.

7. The method of claim 2, wherein the predetermined criteria for repeating the steps of the first mode comprises checking if the change of $\alpha_{ofs}(k)$ over a certain period of time is less than a predetermined value.

8. The method of claim 2, wherein the asymmetry coefficient is represented by α(k), which is calculated according to:

$$\alpha(k)=\alpha(k-1)+G_{\alpha err}\alpha_{err}(k)$$

where $G_{\alpha err}$ is a predetermined constant and $\alpha_{err}(k)$ is given by:

$$\alpha_{err}(k) = \begin{cases} T, & s(k) > T \\ -T, & s(k) < -T \\ s(k), & \text{else.} \end{cases}$$

9. The method of claim 2, wherein the offset coefficient is calculated by a first feedback loop and the asymmetry coefficient is calculated by a second feedback loop.

10. A circuit configured to generate a compensated data signal, the circuit comprising:
   an input node configured to receive a data signal;
   an offset coefficient feedback loop configured to calculate an offset coefficient based on the data signal;
   a scaling unit configured to scale the offset coefficient by a first predetermined value, the scaled offset coefficient representing an estimate of an asymmetry coefficient; and
   an output node that outputs a compensated data signal as a function of the offset coefficient, the estimated asymmetry coefficient and the data signal.

11. The circuit of claim 10, further comprising:
an asymmetry coefficient feedback loop configured to calculate the asymmetry coefficient based on the data signal and an initial value, the initial value being the estimate of the asymmetry coefficient;
a signal selection unit that causes the circuit to calculate the compensated data signal using the estimate of the asymmetry coefficient in a first state and to calculate the compensated data signal using the asymmetry coefficient in a second state; and
wherein the circuit calculates the compensated data signal in the first state until a predetermined criteria is met, and then calculates the compensated data signal in the second state.

12. The circuit of claim 10, wherein the scaling unit multiplies the offset coefficient by a predetermined steady-state ratio of the asymmetry coefficient to the offset coefficient.

13. The circuit of claim 10, wherein the offset coefficient feedback loop calculates the offset coefficient based on the amount of low frequency offset error in the data signal.

14. The circuit of claim 11, wherein the compensated data signal in either state is given by:

$$s(k)=X(k)+\alpha(k)X(k)^2-\alpha_{ofs}(k)$$

where s(k) represents the compensated data signal, X(k) represents the data signal, $\alpha(k)$ represents the estimated asymmetry coefficient in the first state or the asymmetry coefficient in the second state, $\alpha_{ofs}(k)$ represents the offset coefficient, and k represents an interval of discrete time.

15. The circuit of claim 11, wherein the predetermined criteria for repeating the steps of the first state comprises checking if the change of $\alpha_{ofs}(k)$ over a certain period of time is less than a predetermined value.

16. The circuit of claim 11, wherein the asymmetry coefficient is represented by $\alpha(k)$, which is calculated according to:

$$\alpha(k)=\alpha(k-1)+G_{\alpha err}\alpha_{err}(k)$$

where $G_{\alpha err}$ is a predetermined constant and $\alpha_{err}(k)$ is given by:

$$\alpha_{err}(k) = \begin{cases} T, & s(k) > T \\ -T, & s(k) < -T \\ s(k), & \text{else.} \end{cases}$$

17. A non-transitory computer readable medium storing instructions for causing a controller to execute the following steps:

in a first mode:
calculating an offset coefficient based on a data signal;
scaling the offset coefficient to calculate an estimated asymmetry coefficient,
generating the compensated data signal as a function of the offset coefficient, the estimated asymmetry coefficient and the data signal.

18. The non-transitory computer readable medium of claim 17, further comprising:
repeating the steps of the first mode until a predetermined criteria is met; and
in a second mode:
calculating an asymmetry coefficient as a function of the data signal and the offset coefficient, where the initial value of the asymmetry coefficient is the estimated asymmetry coefficient, and
generating the compensated data signal as a function of the offset coefficient and the asymmetry coefficient.

19. The non-transitory computer readable medium of claim 17, wherein scaling the offset coefficient comprises multiplying the offset coefficient by a predetermined steady-state ratio of the asymmetry coefficient to the offset coefficient.

20. The non-transitory computer readable medium of claim 17, wherein the offset coefficient is calculated based on the amount of low frequency offset error to the data signal.

21. The non-transitory computer readable medium of claim 18, wherein the compensated data signal in either mode is given by:

$$s(k)=X(k)+\alpha(k)X(k)^2-\alpha_{ofs}(k)$$

where s(k) represents the compensated data signal, X(k) represents the data signal, $\alpha(k)$ represents the estimated asymmetry coefficient in the first mode or the asymmetry coefficient in the second mode, $\alpha_{ofs}(k)$ represents the offset coefficient, and k represents an interval of discrete time.

22. The non-transitory computer readable medium of claim 18, wherein the predetermined criteria for repeating the steps of the first mode comprises checking if the change of $\alpha_{ofs}(k)$ over a certain period of time is less than a predetermined value.

23. The non-transitory computer readable medium of claim 18, wherein the asymmetry coefficient is represented by $\alpha(k)$, which is calculated according to:

$$\alpha(k)=\alpha(k-1)+G_{\alpha err}\alpha_{err}(k)$$

where $G_{\alpha err}$ is a predetermined constant and $\alpha_{err}(k)$ is given by:

$$\alpha_{err}(k) = \begin{cases} T, & s(k) > T \\ -T, & s(k) < -T \\ s(k), & \text{else.} \end{cases}$$

* * * * *